UNITED STATES PATENT OFFICE.

LEONARD SCHADE van WESTRUM, OF BRANTFORD, ONTARIO, CANADA.

PAINT.

1,127,831.  Specification of Letters Patent.  Patented Feb. 9, 1915.

No Drawing.  Application filed March 7, 1910. Serial No. 547,859.

*To all whom it may concern:*

Be it known that I, LEONARD SCHADE VAN WESTRUM, a subject of the Queen of the Netherlands, residing at Brantford, in the Province of Ontario, Dominion of Canada, have invented certain new and useful Improvements in Paint, of which the following is a specification.

The principal object of my invention is to provide a new and improved paint that shall avoid some of the objections to paints commonly in use at the present time.

Another object of my invention is to provide a paint that shall adhere readily and securely to surfaces having a greater or less amount of moisture on them.

Still another object of my invention is to provide a paint that will serve the purpose of waterproofing articles to which it may be applied.

These objects will be better understood and appreciated after reading the following specification, in which I have disclosed one or more specific embodiments of my invention.

Other objects will also be apparent from the following specification.

I take hard bitumen, like natural asphalt, artificial asphalt, or similar substances, and heat the same, mixing it with any suitable flux, like the residuum of mineral oils, or the residuum of cotton seed oil, or creosote or similar oils. Or, I may use a softer bitumen, such as Texas, California, or Kansas asphalt, which contains a certain proportion of natural flux, and in this case I may use these asphaltums pure, or with a smaller percentage of flux than would be necessary for hard bitumen. Having secured the bitumen with the proper proportion of flux therein, either by procuring bitumen with a natural flux or adding a flux such as described, I then proceed to emulsify the mixture in water. To accomplish this I heat the same until it becomes liquid, then saponify it through acid, alkali, ricinus, oil, ricinus oil, resin, alkaloid, chinolin, pyridin, or piccolin base and a volatile fluid like ammonia, etc., and add enough water to the mixture so that when cold it stays in a fluid state. The product thus emulsified is suitable to be used as paint.

Giving a more specific example, I may take 60 to 80 parts Trinidad or Bermuda asphalt, mix this with 20 to 40 parts suitable flux, emulsify this mixture by adding to the hot mixture 4 to 8 parts resin, 3 to 6 parts resin oil, 2 to 4 parts ammonia and 20 to 40 parts water. These ingredients must be thoroughly mixed so they will readily emulsify in water. Of course, I do not limit my invention to any special process of emulsifying bitumen.

It is well-known that most material surfaces exposed to the atmosphere have a slight film of moisture adhering to them under ordinary or usual condition of weather. Also, most material bodies have more or less water in their pores adjacent to the outer surfaces thereof. With ordinary paint, this water, to some extent, prevents the proper adhesion of the paint to the surface on which it may be applied. Moisture like this under the paint may tend to vaporize and form blisters, or it may otherwise interfere with the paint clinging securely to the surface. By my invention, I take advantage of the moisture on or adjacent to the surfaces of objects to be painted, and rely on this moisture as a carrying agent to suck bituminous material, like asphalt, tar, etc., into the pores of the bodies to which the paint is applied. Then after a few hours the action of the air oxidizes the emulsified asphaltic paint, and it becomes hard and at the same time clings intimately to the surface to which it has been applied. However, it does not cease to have a certain degree of elasticity, which, as is well-known, is a desirable quality of paint.

After my improved paint has been applied to an article for a certain length of time it becomes absolutely waterproof and it can therefore be used to make articles waterproof by coating them therewith. It will go into the pores of wood, iron, stone, concrete, or any other material, filling them up so that no water can get through. Thus by dipping an article in this paint when cold the same result may be accomplished toward waterproofing it as by the old process of heating the article and then treating it.

In waterproofing concrete it has been considered necessary to treat the surface with hot sand in order to absolutely dry it; then hot paint can be applied, but this will always force a certain amount of the moisture that is retained in the concrete to the surface thereof, so that no complete waterproofing effect can be obtained. My paint obviates the necessity for heating either the concrete or the paint. It can also be used to advantage in waterproofing telegraph poles, fence posts, railroad ties, paving blocks, or other wooden articles by injecting the paint cold under pressure, having previously subjected the article to the action of a vacuum, as is well understood in the art.

It is now necessary in using other paints or creosote oil to first get all the moisture and sap out of the wood before they can be applied and they are then applied hot. My paint can be used cold directly and get as good results.

When I refer to "hard bitumen," I mean asphaltums, tar, etc., which are not fluid when cold.

In order to be suitable for paint, the emulsified mixture must not contain more than 10 to 20 parts of added chemicals (acids, resin, ammonia, etc.) and the proportion of asphalt, tar, etc., must be not less than 30 parts, and not more than 80 parts of the whole mixture.

For the purpose of clearly explaining the nature of my invention, I have stated certain specific proportions in which certain ingredients may be combined to constitute an embodiment of the invention, but the invention itself is defined in the following claim.

I claim:

A paint consisting of a temporary emulsion comprising asphalt, a suitable flux, resin, ammonia and water.

LEONARD SCHADE van WESTRUM.

Witnesses:
 KATHLEEN OGRADY,
 RUTH W. MACDONALD.